No. 717,780. PATENTED JAN. 6, 1903.
J. TIMMS.
CAR TRUCK.
APPLICATION FILED MAY 8, 1902.
NO MODEL.
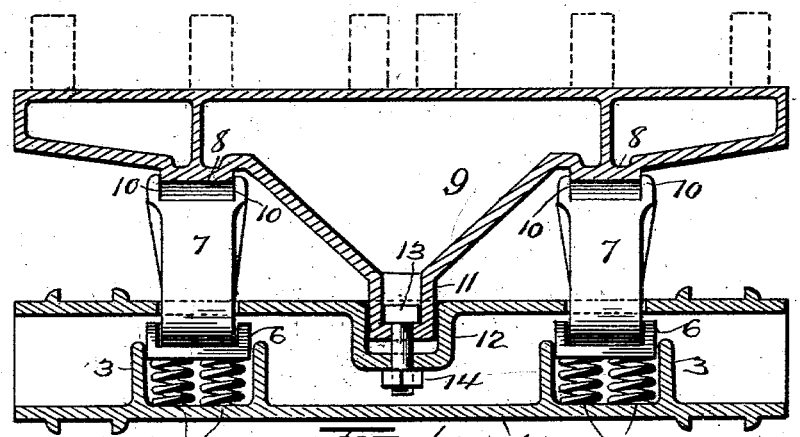
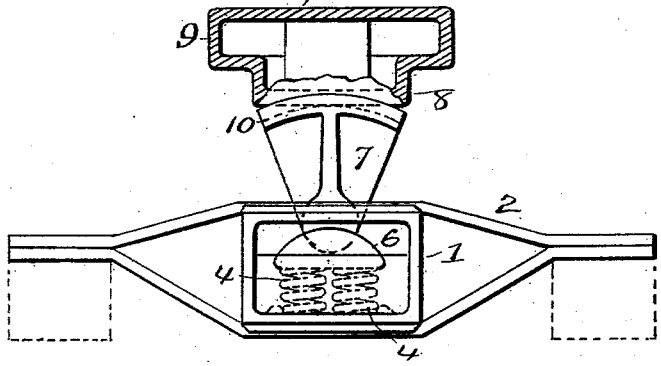
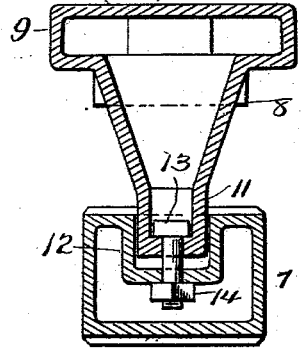
WITNESSES
INVENTOR
James Timms
By H. A. Seymour,
Attorney

UNITED STATES PATENT OFFICE.

JAMES TIMMS, OF COLUMBUS, OHIO, ASSIGNOR TO THE BUCKEYE MALLEABLE IRON AND COUPLER COMPANY.

CAR-TRUCK.

SPECIFICATION forming part of Letters Patent No. 717,780, dated January 6, 1903.

Application filed May 8, 1902. Serial No. 106,468. (No model.)

*To all whom it may concern:*

Be it known that I, JAMES TIMMS, a resident of Columbus, in the county of Franklin and State of Ohio, have invented certain new and useful Improvements in Car-Trucks; and I do hereby declare the following to be a full, clear, and exact description of the invention, such as will enable others skilled in the art to which it appertains to make and use the same.

My invention relates to an improvement in car-trucks, the object of the invention being to simplify and lighten car construction by dispensing altogether with a truck-bolster and carrying the load more directly on the springs.

A further object is to so construct the truck that the resistance to the truck in rotating or curving may be reduced.

With these objects in view the invention consists in certain novel features of construction and combinations and arrangements of parts, as will be more fully hereinafter described, and pointed out in the claims.

In the accompanying drawings, Figure 1 is a view, partially in section, illustrating my improvements. Fig. 2 is an end view, and Fig. 3 is a view in vertical transverse section through the center of Fig. 1.

1 represents my improved truck-transom, which connects the side frames 2 of the truck and is preferably made hollow and of general rectangular shape, as shown. The truck-transom is preferably open at its ends, provided with numerous perforations to lighten the construction, and is provided near its ends on its lower member with pockets 3 for springs 4. Four springs are located in each pocket, (but it is to be understood that the number of springs can be varied at will,) and said springs are surmounted by caps 6, flanged at each side to prevent lateral displacement of side bearings 7, supported thereon. The side bearings 7 are widest at their upper ends and are rounded at both ends, the lower rounded end resting on cap 6 and the upper rounded end supporting flat bearings 8 on the body-transom 9 and made with flanges 10 at each side to prevent displacement of parts.

The body-transom 9 is provided with a central depending circular tongue 11, mounted in a depressed pocket or guide 12 in truck-transom 1, and a king-bolt 13 is passed through tongue 11 and bottom of pocket 12 and has a nut 14 screwed thereon to limit the upward movement of the tongue and prevent its escape from the guide or pocket, while the latter serves to prevent independent movement of the transom laterally or longitudinally, but will not interfere with slight pivotal or rolling motion of the body-transom or the truck in turning.

It will be seen that with my improvements I dispense entirely with the truck-bolster and support the body-transom directly on springs through the medium of the side bearings, which latter permit slight rolling movement at both ends owing to their rounded ends being in engagement with the flat surface of the cap 6 and the bearings 8 of body-transom 9.

A great many slight changes and alterations might be resorted to in the general form and arrangement of parts described without departing from my invention, and hence I do not wish to be limited to the precise construction set forth, but consider myself at liberty to make such slight changes and alterations as fairly fall within the spirit and scope of my invention.

Having fully described my invention, what I claim as new, and desire to secure by Letters Patent, is—

1. The combination with a car-body and side truck-frames, of a body-transom depending from the car-body, a truck-transom connecting the side frames, springs within the truck-transom and rocking bearing-pieces resting on said springs and engaging at their upper ends the under face of the body-transom.

2. The combination with a truck-transom, of springs therein, a car-body, a body-transom depending from the car-body, rocking side bearing-pieces supported on the springs in the truck-transom, and having bearings at their upper ends against the under face of the body-transom.

3. The combination with a truck-transom, of springs carried thereby, caps on the springs, a body-transom pivotally connected at its center to the truck-transom and side bearing-pieces having a rocking or rolling engagement with the under face of the body-transom and resting upon the caps covering the springs, substantially as described.

4. The combination with a hollow truck-transom, of springs therein, a body-transom, and side bearing-pieces having a rolling or rocking engagement with the under face of the body-transom, and projecting into the truck-transom and supported on the springs.

5. The combination with a truck-transom having a central pocket or guide, of a body-transom, a central depending tongue on the body-transom projecting into said pocket or guide, a king-bolt pivotally securing the tongue in the pocket, springs in the truck-transom near its ends, caps on the springs, and side bearings between the caps and body-transom and rounded or curved at both ends, substantially as described.

6. The combination with a truck-frame, of a hollow truck-transom, a body-transom, springs in the truck-transom, caps on the springs, side bearings projecting through openings in the truck-transom, rounded at both ends and resting on the caps, and flat bearings on the body-transom supported on the rounded or curved upper ends of the side bearings, and flanges at the respective side edges of the side bearings at their upper ends to guide the body-transom bearings thereon.

In testimony whereof I have signed this specification in the presence of two subscribing witnesses.

JAMES TIMMS.

Witnesses:
HARRY WRIGHT,
ARNO EBERLEIN.